(12) United States Patent
Mitsuze et al.

(10) Patent No.: US 9,609,476 B2
(45) Date of Patent: Mar. 28, 2017

(54) WIRELESS DEVICE, WIRELESS BASE STATION, AND CONTROL METHOD FOR A FAILURE IN A WIRELESS NETWORK

(71) Applicant: FUJITSU LIMITED, Kawasaki-shi, Kanagawa (JP)

(72) Inventors: Reiko Mitsuze, Yokohama (JP); Norio Murakami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/978,614

(22) Filed: Dec. 22, 2015

(65) Prior Publication Data

US 2016/0198293 A1    Jul. 7, 2016

(30) Foreign Application Priority Data

Jan. 6, 2015   (JP) .................................. 2015-000949

(51) Int. Cl.
*H04W 4/02*     (2009.01)
*H04L 25/03*    (2006.01)
*H04L 12/26*    (2006.01)

(52) U.S. Cl.
CPC .............. *H04W 4/02* (2013.01); *H04L 25/03* (2013.01); *H04L 43/0823* (2013.01)

(58) Field of Classification Search
CPC ....... H04W 4/02; H04L 43/0823; H04L 25/03
USPC ....................................................... 455/561
See application file for complete search history.

(56) References Cited

U.S. PATENT DOCUMENTS

| | | | | |
|---|---|---|---|---|
| 6,633,997 | B1* | 10/2003 | Kaneko ............... | G06F 11/0727 707/999.202 |
| 8,433,260 | B2* | 4/2013 | Kenington ............ | H04W 88/08 455/115.4 |
| 2008/0119198 | A1* | 5/2008 | Hettstedt ............... | H04W 16/06 455/453 |
| 2012/0157089 | A1* | 6/2012 | Yang .................... | H04L 12/2464 455/424 |
| 2012/0213128 | A1* | 8/2012 | Miyata ................. | H04B 7/0426 370/277 |
| 2014/0171063 | A1* | 6/2014 | Mori ..................... | H04W 52/20 455/424 |
| 2015/0341802 | A1* | 11/2015 | Chiang ................. | H04W 24/02 455/424 |

FOREIGN PATENT DOCUMENTS

| | | |
|---|---|---|
| JP | 2001-005693 A | 1/2001 |
| JP | 2003-150407 A | 5/2003 |
| JP | 2009-135731 A | 6/2009 |
| JP | 2009-211618 A | 9/2009 |

* cited by examiner

*Primary Examiner* — Brandon Miller
(74) *Attorney, Agent, or Firm* — Arent Fox LLP

(57) ABSTRACT

A wireless device including: an antenna wirelessly coupled to a terminal, a network interface coupled to a baseband unit (BBU) that perform baseband processing, and a processor configured to: convert a wireless signal received from the terminal into a baseband signal to be transmitted to the BBU, convert a baseband signal received from the BBU into a wireless signal to be transmitted to the terminal, and determine, when failure occurs in the wireless device, whether the wireless device takes a measure against the failure or not based on a first index indicating a level of the failure and a second index relating to the number of users that are affected by the failure.

9 Claims, 16 Drawing Sheets

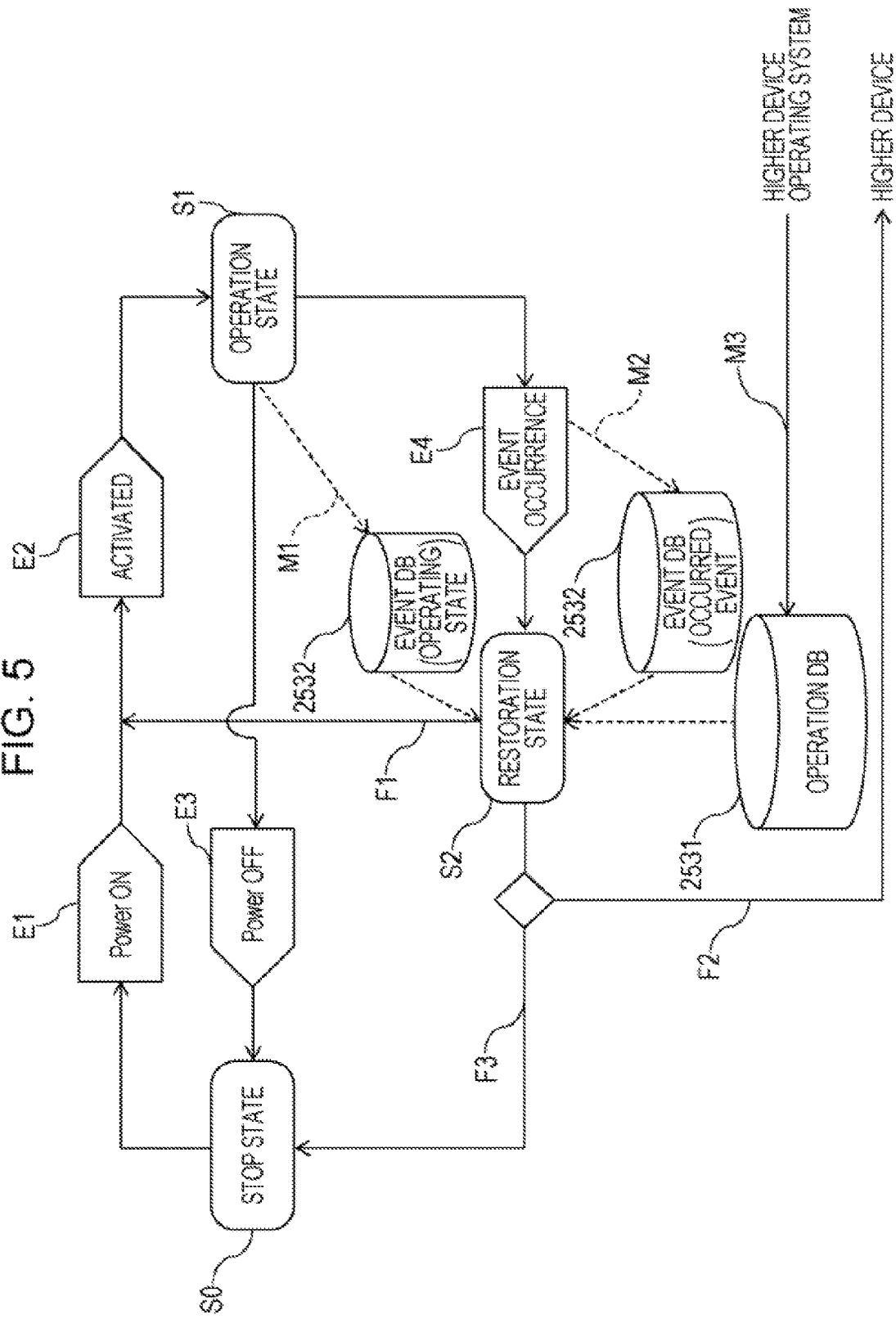

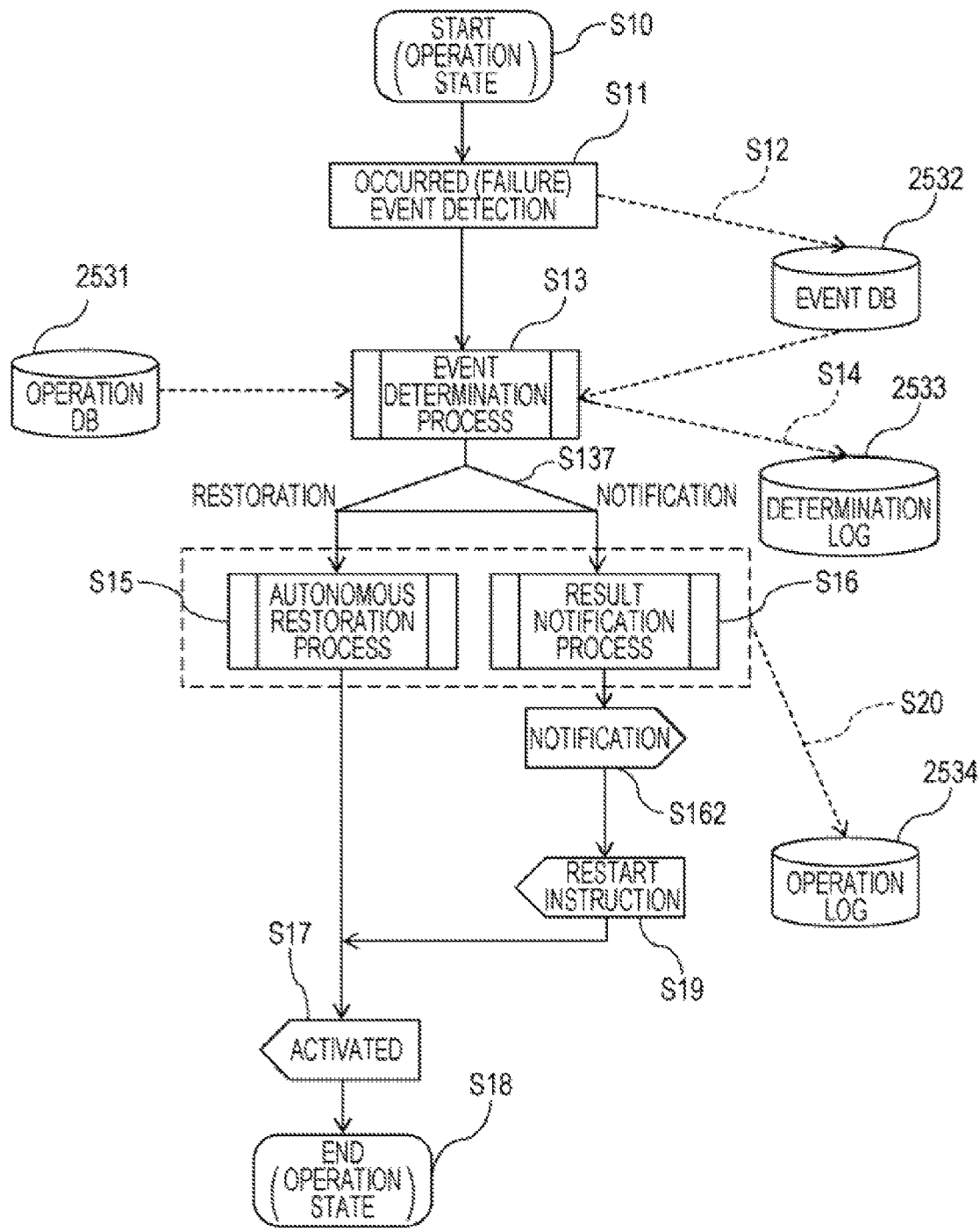

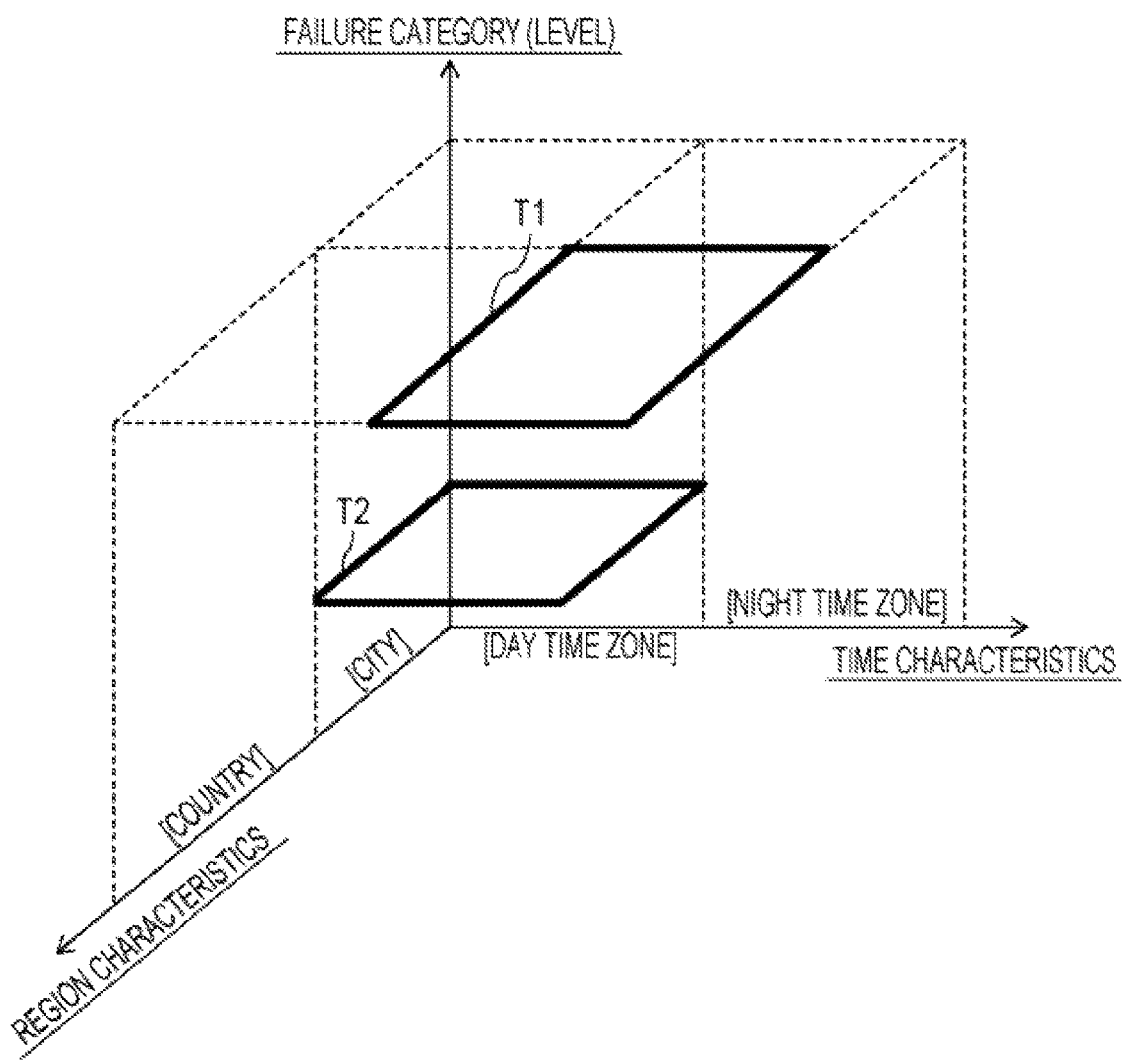

FIG. 8

|  | CHARACTERISTIC INDEX #1 | CHARACTERISTIC INDEX #2 | CHARACTERISTIC INDEX #3 |
|---|---|---|---|
| FAILURE LEVEL #1 | NOTIFIES HIGHER DEVICE | RESTORE FUNCTION #A OF LOWER DEVICE | RESTORE FUNCTION #B OF LOWER DEVICE |
| FAILURE LEVEL #2 | RESTORE FUNCTION #A OF LOWER DEVICE | RESTORE FUNCTION #B OF LOWER DEVICE | RESTORE FUNCTION #C OF LOWER DEVICE |
| FAILURE LEVEL #3 | RESTORE FUNCTION #C OF LOWER DEVICE | RESTORE FUNCTION #C OF LOWER DEVICE | RESTORE FUNCTION #D OF LOWER DEVICE |

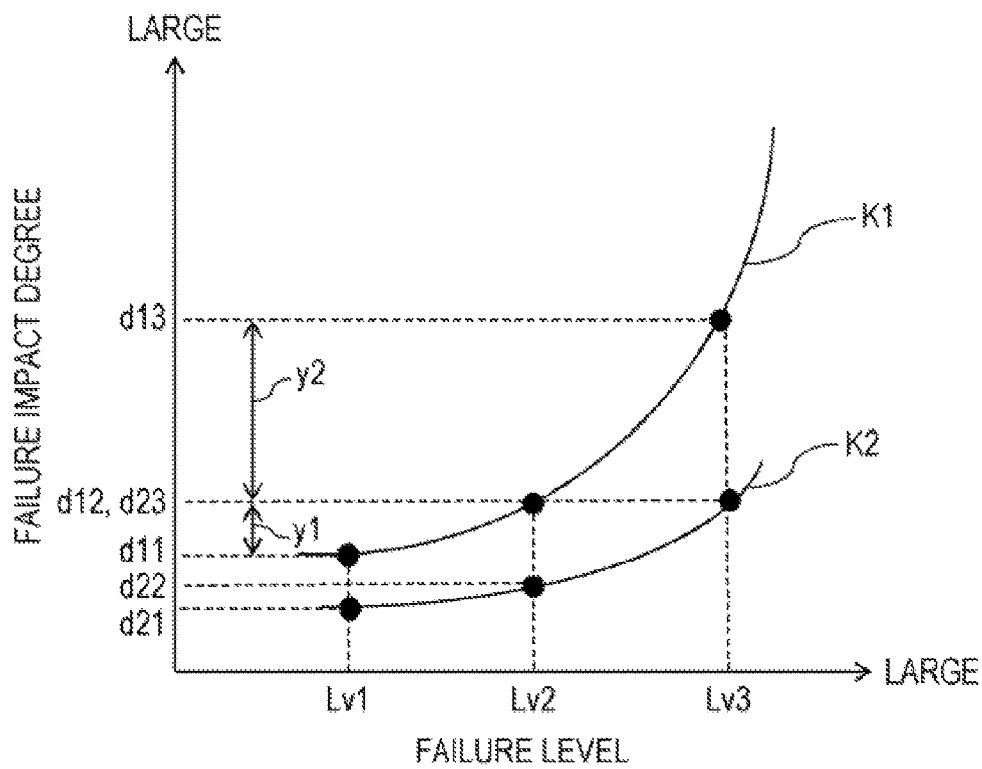

| NO. | EVENT | CATEGORY |
|---|---|---|
| 1 | ABNORMALITY IN TRANSMISSION PATH OUTPUT (DETECT ABNORMALITY IN POWER FROM FEEDBACK SIGNAL OF TRANSMISSION OUTPUT) | Major |
| 2 | RECEPTION PATH POOR SENSITIVITY MAIN (DETECT ABNORMALITY IN RECEPTION SENSITIVITY OF MAIN ANTENNA) | Major |
| 3 | RECEPTION PATH POOR SENSITIVITY DIVERSITY (DETECT ABNORMALITY IN RECEPTION SENSITIVITY OF DIVERSITY ANTENNA) | Major |
| 4 | SIGNAL LOSS FROM HIGHER DEVICE (DETECTION OF OPTICAL SIGNAL FROM HIGHER DEVICE IS NOT POSSIBLE) | Critical |
| 5 | FRAME SIGNAL LOSS FROM HIGHER DEVICE (THERE IS OPTICAL SIGNAL FROM HIGHER DEVICE, BUT FRAME SYNCHRONIZATION IS NOT PERFORMED) | Critical |
| 6 | COMMUNICATION ERROR (THERE IS SIGNAL COMMUNICATION FROM HIGHER DEVICE, BUT MESSAGE IS NOT ARRIVED) | Critical |
| 7 | SYSTEM TIME SYNCHRONIZATION DEVIATION (EXTRACTION OF REFERENCE CLOCK FROM OPTICAL SIGNAL IS NOT POSSIBLE) | Minor |
| 8 | INTERNAL SW MONITORING ERROR (DETECT TEMPORARY ABNORMALITY IN SW MONITORING BLOCK IN DEVICE) | Major |
| 9 | INTERNAL HW MONITORING ERROR (DETECT TEMPORARY ABNORMALITY IN HW MONITORING BLOCK IN DEVICE) | Minor |
| 10 | ALARM HIGH TEMPERATURE IN DEVICE (TEMPERATURE IN DEVICE IS ABNORMALLY HIGH) | Critical |

| DATE AND TIME | OPERATION TRANSITION |
|---|---|
| MAY 1, 2014  10:20:30 | ACTIVATED |
| MAY 1, 2014  10:21:05 | BEING OPERATING |
| . . . . | |

| DATE AND TIME | EVENT |
|---|---|
| JUNE 15, 2014  21:33:45 | NO. 4 OCCURRED |
| JUNE 15, 2014  21:33:57 | NO. 4 RESTORED |
| JULY 3, 2014  07:12:05 | NO. 9 OCCURRED |
| JULY 3, 2014  07:12:07 | NO. 9 RESTORED |
| . . . . | . . . |

| NO. | CATEGORY | OPERATION | IMPACT DEGREE |
|---|---|---|---|
| 1 | Critical | NO NOTIFICATION TO HIGHER DEVICE, AUTONOMOUS RESTART AFTER RECORDING IN DEVICE | 6 |
| 2 | Major | AFTER NOTIFICATION TO HIGHER DEVICE, MONITORING UNTIL EXCESS OF THRESHOLD | 3 |
| 3 | Minor | MAINTAIN CURRENT STATE | 1 |

FIG. 17

| NO. | REGIONAL CHARACTERISTICS | OPERATION | IMPACT DEGREE |
|---|---|---|---|
| 1 | CITY TYPE | FOCUS ON CATEGORY COMPLIANCE | 7 |
| 2 | EVENT OVERCROWDED TYPE | MAINTAIN CURRENT STATUS EXCEPT FOR CRITICAL | 9 |
| 3 | MAIN TYPE | | 5 |
| 4 | MOUNTAIN AREA | RESTART IS POSSIBLE WITHOUT WORRYING | 2 |

FIG. 18

| NO. | TIME ZONE | OPERATION | IMPACT DEGREE |
|---|---|---|---|
| 1 | MIDNIGHT TO MORNING | RESTART IS POSSIBLE WITHOUT WORRYING | 2 |
| 2 | MORNING TO NOON | MAINTAIN CURRENT STATUS EXCEPT FOR CRITICAL | |
| 3 | EVENING TO NIGHT | | |
| 4 | NIGHT TO MIDNIGHT | FOCUS ON CATEGORY COMPLIANCE | 7 |

| EVENT NO. | OCCURRENCE TIME | CATEGORY LEVEL | REGIONAL CHARACTERISTICS | TIME ZONE | TOTAL IMPACT DEGREE | DETERMINATION |
|---|---|---|---|---|---|---|
| 4 | 2014/07/09 23:31:30 | 6 | 7 | 7 | 7 | AUTONOMOUS RESTART |
| .. | ...... | ... | ... | ... | ... | ...... |
| .. | ...... | ... | ... | ... | ... | ...... |

| DATE AND TIME | EVENT | OPERATION RECORD | RESULT |
|---|---|---|---|
| JULY 18, 2014 12:45:22 | NO. 3 | ONLY RECEPTION UNIT RESTART PROCESS | GOOD |
| JULY 19, 2014 05:39:03 | NO. 8 | .......... | GOOD IN 3 CYCLES |
| JULY 20, 2014 16:11:49 | ... | .......... | NOTIFY HIGHER NODE WITHOUT RESTORATION |

WIRELESS DEVICE, WIRELESS BASE STATION, AND CONTROL METHOD FOR A FAILURE IN A WIRELESS NETWORK

CROSS-REFERENCE TO RELATED APPLICATION

This application is based upon and claims the benefit of priority of the prior Japanese Patent Application No. 2015-000949, filed on Jan. 6, 2015, the entire contents of which are incorporated herein by reference.

FIELD

The embodiments discussed herein are related to a wireless device.

BACKGROUND

Currently, a communication system such as cellular telephone systems and wireless local area network (LAN) is widely used. In the field of wireless communication, continuous discussions have been conducted on the next generation communication technique in order to further improve the communication speed and the communication capacity. For example, in 3rd generation partnership project (3GPP) which is a standardization organization, standardization of a communication standard called long term evolution (LTE) and a LTE-based communication standard called LTE-Advanced (LTE-A) has been completed or considered.

In such a communication system, a terminal device can receive various provided services, such as call services and content delivery services, through wireless communication between a terminal device and a base station device. However, when the terminal device is located inside a building or in a mountainous area, it is difficult to receive the services due to the influence of such obstacles.

In contrast, there is a base station device including a wireless unit (hereinafter, referred to as a remote radio head (RRH)) and a baseband control unit (hereinafter, referred to as a base band unit (BBU)) which are physically located away from each other. For example, the terminal device can receive the provided services without being affected by such obstacles, by placing the RRH inside a building or in a mountainous area.

Such a base station device is configured in such a manner that a plurality of RRHs are connected to a single BBU. For example, the RRH performs a specific function in the base station device, and the BBU performs control for the entire base station device. Thus, for example, the BBU becomes a higher device, and the RRH becomes a lower device, such that the BBU is able to perform various controls for the RRH, and the functions performed by the base station device can be hierarchically separated.

In this way, although the RRH performs a specific function, there is a case in which failure or malfunction occurs when the RRH performs the specific function. In this case, the RRH outputs information about the failure or the malfunction to the BBU, and the BBU receives the information from the RRH. The BBU displays the received information about the failure or the malfunction on a monitor screen so as to notify the system operator of the occurrence of the failure or the malfunction.

For example, the following techniques are present as techniques for the communication system.

In other words, there is a technique related to an automatic failure restoration (or recovery) system in which a computer system previously associates an error code and an error level in a correspondence table, and automatically executes a restoration method according thereto.

According to the technique, for example, the work load of a system engineer of a computer system can be reduced.

Further, there is a technique related to an automatic failure restoration system in which a restoration instructing device acquires error information from individual monitoring devices, specifies the cause corresponding to the error information, and transmits a modification program and the like to a user system.

According to the technique, for example, it is possible to restore a system, while a system administrator does not analyze the cause of the failure.

Further, there is a technique related to an automatic failure restoration device in which the implementation timing of restoration is adjusted from information indicating an urgency degree and an importance degree contained in failure information.

According to the technique, for example, automatic restoration can be performed at an appropriate timing in accordance with the contents of the failure.

Further, there is a technique related to a wireless network control device, and a failure processing method thereof, which sequentially turns apparatuses which are in use on a service connection path to a standby state and determines an operational state, when detecting the abnormality in a service.

According to the technique, for example, it is possible to specify a device which is the cause of the failure occurrence, and appropriate failure restoration is possible.

Japanese Laid-open Patent Publication No. 2001-5693, Japanese Laid-open Patent Publication No. 2003-150407, Japanese Laid-open Patent Publication No. 2009-211618, and Japanese Laid-open Patent Publication No. 2009-135731 are examples of the related art.

SUMMARY

According to an aspect of the invention, a wireless device includes an antenna wirelessly coupled to a terminal, a network interface coupled to a baseband unit (BBU) that perform baseband processing, and a processor configured to: convert a wireless signal received from the terminal into a baseband signal to be transmitted to the BBU, convert a baseband signal received from the BBU into a wireless signal to be transmitted to the terminal, and determine, when failure occurs in the wireless device, whether the wireless device takes a measure against the failure or not based on a first index indicating a level of the failure and a second index relating to the number of users that are affected by the failure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a state transition diagram of the RRH;

FIG. 6 is a diagram illustrating a process flow example of the RRH;

FIG. 7 is a diagram illustrating an example of a failure impact degree calculation method (first method);

FIG. 8 is a diagram illustrating an example of the failure impact degree calculation method (first method);

FIG. 9 is a diagram illustrating an example of a failure impact degree calculation method (second method);

FIG. 12 is a diagram illustrating an example of an event category list;

FIG. 13 is a diagram illustrating an example of an operating state history;

FIG. 14 is a diagram illustrating an example of an occurred event record;

FIG. 17 is a diagram illustrating an example of a list of regional characteristics and an impact degree;

FIG. 18 is a diagram illustrating an example of a list of time zones and impact degree;

FIG. 19 is a diagram illustrating an example of a determination log;

FIG. 20 is a diagram illustrating an example of an operation log; and

DESCRIPTION OF EMBODIMENTS

If a system operator is notified of information about malfunction or failure detected by the RRH, the system operator determines a handling procedure for the occurred failure or malfunction (namely, a measure taken against the occurred failure or malfunction), and causes the RRH having the occurred failure and the like to undergo a restoration treatment.

However, in the base station device in which functions are hierarchically separated, if the scale is expanded, the number of RRHs becomes enormous, and the number of pieces of Information about failure or fault to be notified to the BBU also becomes enormous. The system operator determines a handling procedure based on the notified information about failure, and determines a handling procedure about enormous number of pieces of information about failure or malfunction. Since the system operator determines a handling procedure for all failure or malfunction, it takes time to execute the handling procedure. Therefore, it takes time to restore the failure or malfunction, and it interferes with the continuation of the communication services.

In addition, there are various installation locations of the RRH, for example, indoors, or a mountainous region. However, the system operator may take the same handling procedure for a certain failure, regardless of the Installation location of the RRH. In some cases, the handling procedure that the system operator has taken is suitable for, for example, RRHs that are installed in densely populated areas, but is not suitable for RRHs that are installed in sparsely populated areas. Thus, for example, in the determination without considering the installation location of the RRH, it is not possible to undergo appropriate handling procedures corresponding to separate RRHs that are installed in various locations, and this interferes with the continuation of the communication services.

In the above-mentioned technology of performing failure restoration by associating an error code and an error level in a correspondence table, a handling procedure according to the state of an Individual device is not disclosed. The same applies for the other three techniques described above.

Therefore, it is not possible to provide the continuity of the communication service in the techniques described above.

Thus, one disclosure is to provide a wireless device configured to provide the continuity of communication services.

The following describes aspects for implementing the present embodiment.

First Embodiment

Figure 1:
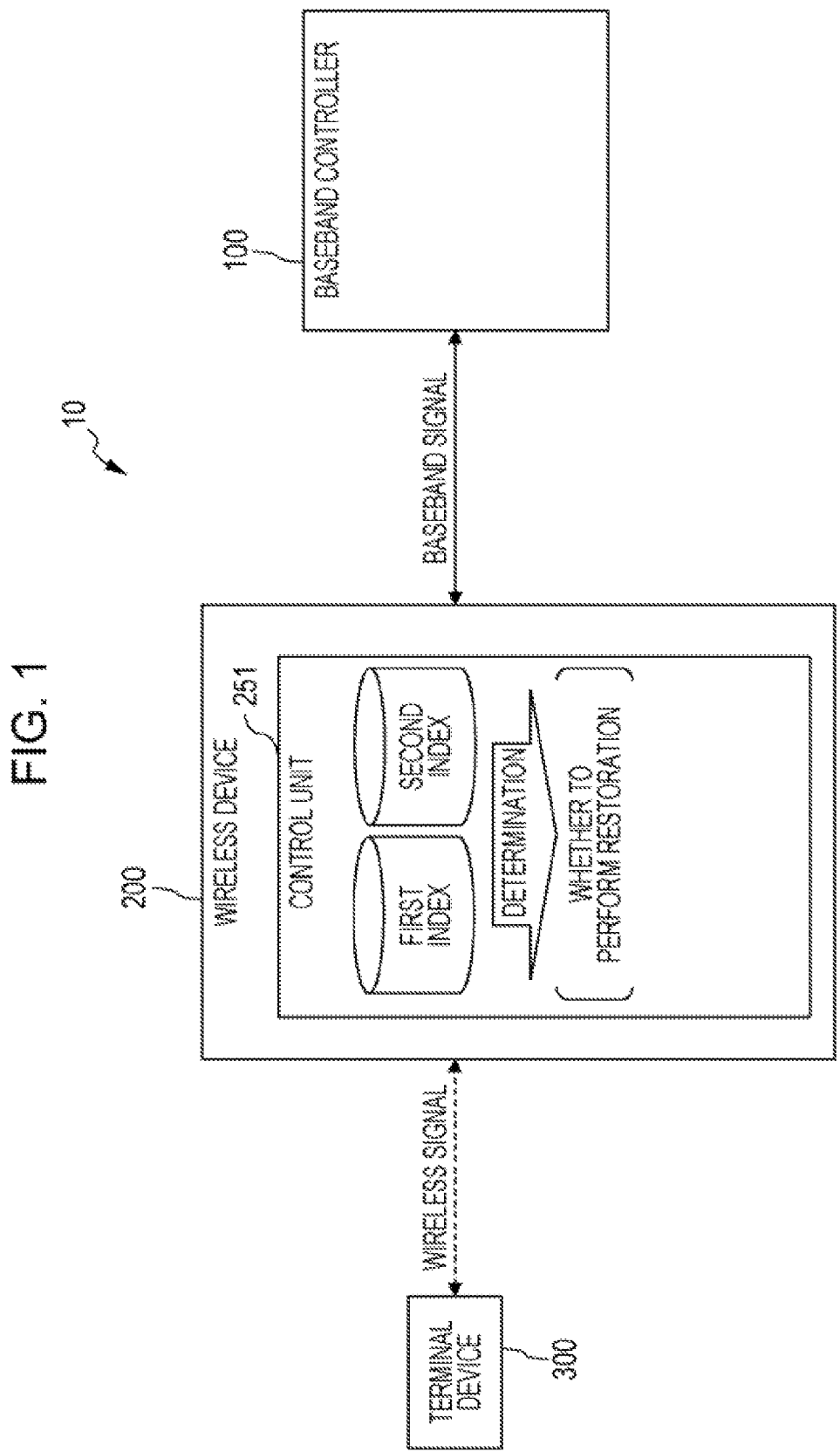
FIG. 1 is a diagram illustrating a configuration example of a communication system.

FIG. 1 illustrates a configuration example of a communication system 10 according to a first embodiment. The communication system 10 includes a baseband controller 100, a wireless device 200, and a terminal device 300.

The baseband controller 100 is connected to, for example, the wireless device 200 through a wire. The baseband controller 100 converts a baseband signal received from the wireless device 200 into, for example, a signal of a format corresponding to the connected core network 500, and outputs the converted signal to the core network 500. Further, the baseband controller 100 receives a signal from, for example, the connected core network 500, converts the signal into a baseband signal, and outputs the converted baseband signal to the wireless device 200.

The wireless device 200 is connected to, for example, the baseband controller 100 through a wire, and communicates with the terminal device 300 through wireless signals. The wireless device 200 converts, for example, the wireless signal received from the terminal device 300 into a signal of a baseband bandwidth through frequency conversion, and outputs the converted baseband signal to the baseband controller 100. Further, the wireless device 200 converts the baseband signal output from the baseband controller 100 into a signal of a wireless bandwidth through frequency conversion, and outputs the converted wireless signal to the terminal device 300.

The terminal device 300 communicates with, for example, the wireless device 200 through wireless signals. When the terminal device 300 is located in the service area of the wireless device 200, the terminal device 300 communicates with wireless device 200 by transmitting and receiving wireless signals. The terminal device 300 can receive various types of services such as a call service and a content display service, by performing communication in such a manner.

In the first embodiment, when failure occurs in the wireless device 200, some wireless devices 200 may autonomously (or independently) perform a restoration process. Hereinafter, a process performed when failure occurs in the wireless device 200 will be described.

The wireless device 200 is provided with a control unit 251. If failure occurs in the wireless device 200, the control unit 251 performs determination as to whether or not the failure is to be autonomously restored in the wireless device 200. Further, when it is determined that the failure is to be autonomously restored in the wireless device 200, the control unit 251 also determines the processing contents of the restoration. In the determination as to whether or not the failure is to be autonomously restored in the wireless device 200 and the determination of the processing contents of the restoration, the control unit 251 uses a first index and a second index. The first index is, for example, an index indicating the level of failure. Examples of the second index include an Index regarding the installation location of the wireless device, an index regarding a time when failure occurs, an index regarding the failure occurrence probability, or the combination thereof. The control unit 251 calculates the failure impact degree by using the first and second indices. The failure impact degree will be described later. The control unit 251 determines whether or not the failure is to be autonomously restored and the processing contents in the case of restoration, depending on the failure impact degree. When the control unit 251 determines that the failure is to be autonomously restored, the wireless device 200 autonomously restores the failure by performing the processing contents determined by the control unit 251.

The wireless device 200 uses the first index indicating the failure level as well as the second index different from the first index to calculate the failure impact degree. The failure impact degree calculated by considering, for example, the Installation location of the wireless device 200 and the like in addition to the level of the failure itself is the failure impact degree that is calculated by considering the status of the installation location of individual wireless device 200. Since the individual wireless device 200 undergoes a handling procedure for autonomous failure restoration, based on the failure impact degree, an appropriate restoration treatment is performed for each wireless device 200. Therefore, since the wireless device 200 autonomously restores the failure that has occurred in the wireless device 200, the wireless device 200 can perform the restoration process without waiting for the determination of the operator of the communication system 10, and can provide the continuity of the communication service. Further, since the wireless device 200 autonomously restores the failure that has occurred in the wireless device 200, the number of failures for which the processing contents of the restoration are determined by the operator of the communication system 10 decreases, and the work load of the operator of the communication system 10 is reduced.

Second Embodiment

Figure 2:
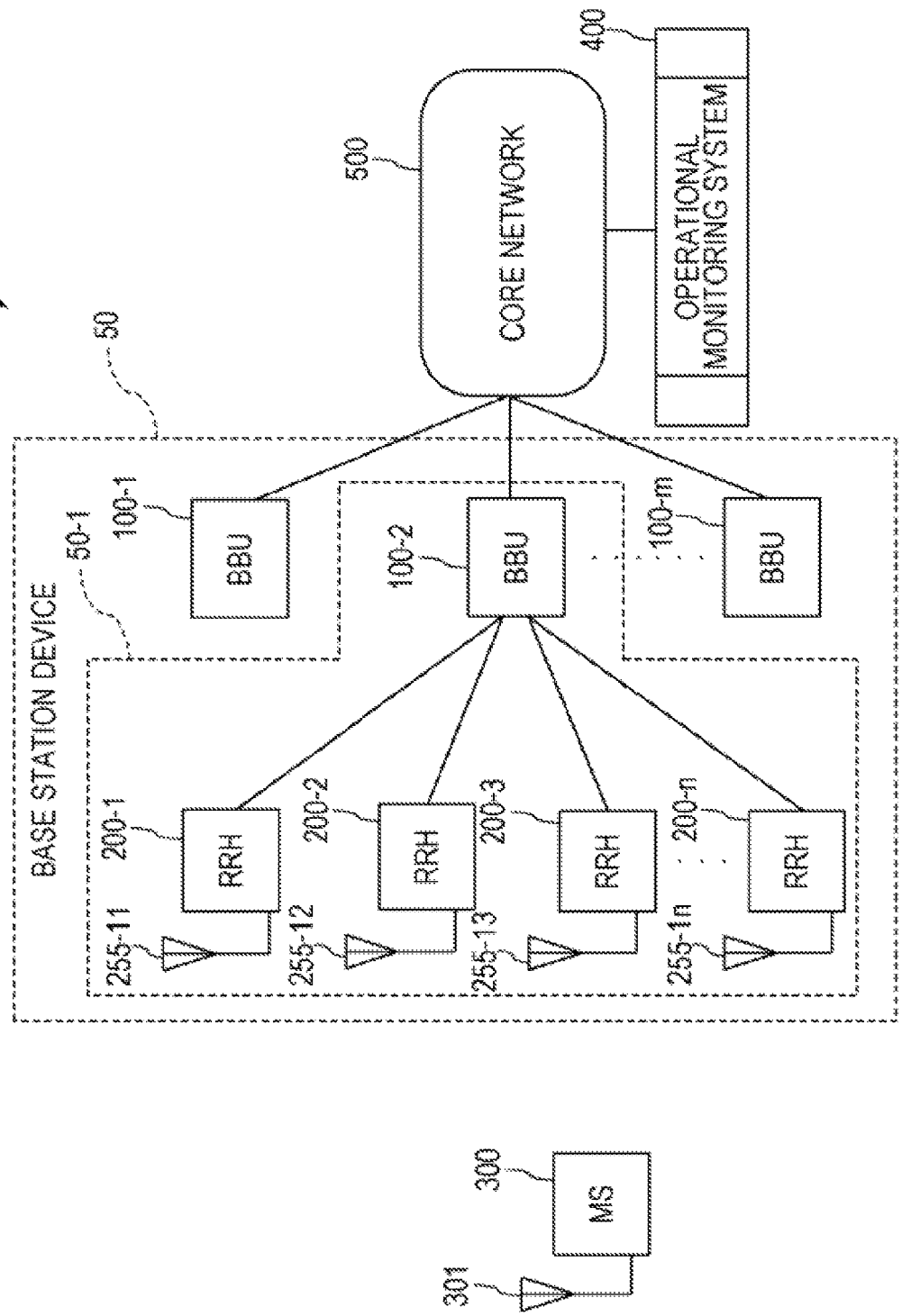
FIG. 2 is a diagram illustrating a configuration example of the communication system.

Next, a second embodiment will be described.
Configuration Example of Communication System The configuration example of a communication system 10 according to the second embodiment will be described. FIG. 2 illustrates the configuration example of the communication system 10.

The communication system 10 includes a base station device 50, a mobile station (MS) 300, an operational monitoring system 400, and a core network 500.

The base station device 50 is a wireless communication apparatus that performs wireless communication with the MS 300. The base station device 50 provides a variety of services such as call services and content distribution service, by performing wireless communication with the MS 300 located in the service area of the base station. In this case, the base station device 50 receives user data and the like such as audio data and video data from the core network 500, converts the received user data and the like into wireless signals. The base station device 50 transmits the converted wireless signal to the MS 300. Further, the base station device 50 receives wireless signals transmitted from the MS 300, extracts user data and the like from the wireless signals, and transmits the extracted wireless signals to the core network 500.

Further, the base station device 50 can transmit information about failure and fault that are detected by the base station to the operational monitoring system 400 through the core network 500.

The MS 300 is a terminal device that performs wireless communication with the base station device 50, and is, for example, a feature phone, a smart phone, or the like. The MS 300 can receive the variety of services described above, provided through the base station device 50.

The operational monitoring system 400 monitors the operation state (or service state) of the base station device 50, and performs a process for restoring the failure, occurred in the base station device 50. For example, the following process is performed. In other words, the operational monitoring system 400 receives the Information regarding the failure or the malfunction from the base station device 50, and displays the information on a display unit and the like. Then, the system operator determines the handling procedure, based on the contents of the displayed failure information. The system operator can execute the handling procedure by operating the operational monitoring system 400. The operational monitoring system 400 can restore the base station device 50, by transmitting a control signal to the base station device 50 in which the failure or the fault occurs, and performing control so as to stop or reset a part of the base station device 50.

In addition, a single operation monitoring device or a plurality of operation monitoring devices may be included in the operational monitoring system 400.

The core network 500 is a network to which BBUs 100-1 to 100-m, the operational monitoring system 400, and the like are connected. Devices in a network such as a mobility management entity (MME) that controls communication, a serving-gateway (S-GW) that relays data that is transmitted and received with other networks, and the like may be connected to the core network 500.

As illustrated in FIG. 2, the base station device 50 includes a plurality of BBUs 100-1 to 100-m (m is an Integer of 2 or more) and a plurality of RRHs 200-1 to 200-n (n is an integer of 2 or more). Although a plurality of RRHs 200-1 to 200-n, . . . are connected to each of the BBUs 100-1 to 100-m, FIG. 2 illustrates an example in which RRHs 200-1 to 200-n are connected to the BBU 100-2.

For example, RRHs 200-1 to 200-n are installed at locations away from the BBU 100-2 by a predetermined distance or more, such as mountainous areas and buildings. Thus, for example, even when the MS 300 is located in a mountainous area or inside a building, the MS 300 can perform wireless communication with the base station device 50 through respective RRHs 200-1 to 200-n, and receive the provided services.

For example, the BBU 100-2 is a higher device, and a plurality of RRHs 200-1 to 200-n are lower devices. The BBU 100-2 controls the plurality of RRHs 200-1 to 200-n, and the functions performed by the base station device 50 are hierarchically separated.

The BBU 100-2 is, for example, a baseband control unit (or a baseband controller), and performs a process on the baseband signal. The BBU 100-2 receives user data and the like from the core network 500, and performs an error correction coding process, a modulation process, and the like on the received user data so as to convert the user data into an In-phase/Quadrature phase (IQ) signal. The BBU 100-2 transmits the converted IQ signal to any RRH 200-1 to 200-*n*, among a plurality of RRHs 200-1 to 200-*n*. The BBU 100-2 receives the IQ signal output from each RRH 200-1 to 200-*n*, and performs a demodulation process, an error correction decoding process, and the like on the received IQ signal so as to extract the user data and the like. The BBU 100-2 transmits the extracted user data and the like to the core network 500.

Each RRH 200-1 to 200-*n* is, for example, a wireless unit (or a wireless device), and performs a process on a wireless signal. Each RRH 200-1 to 200-*n* receives the IQ signal transmitted from the BBU 100-2, and performs a frequency conversion process, a digital to analogue (D/A) process, and the like on the received IQ signal so as to convert the IQ signal into a wireless signal. Each RRH 200-1 to 200-*n* transmits the converted wireless signal to the MS 300 through each antenna 255-11 to 255-1*n*. Further, each RRH 200-1 to 200-*n* receives the wireless signal transmitted from the MS 300 through each antenna 255-11 to 255-1*n*. Each RRH 200-1 to 200-*n* extracts an IQ signal by performing a frequency conversion process, an analogue to digital (D/A) process, and the like on the received wireless signal, and transmits the extracted IQ signal to the BBU 100-2.

In addition, the BBU 100-2 and each RRH 200-1 to 200-*n* can transmit and receive the IQ signal, for example, in a common public radio interface (CPRI) format.

Further, FIG. 2 illustrates an example in which the BBU 100-2 is connected to a plurality of RRHs 200-1 to 200-*n*, but a plurality of RRHs are also connected to other BBUs 100-1, and 100-3 to 100-*m*.

Further, FIG. 2 illustrates an example of the base station device 50 including a plurality of BBUs 100-1 to 100-*m*, but the base station device 50 may be a base station device 50-1 including a single BBU 100-2.

Configuration Example of RRH 200

Next, the configuration example of each RRH 200-1 to 200-*n* in the base station device 50 will be described. In addition, since the RRHs 200-1 to 200-*n* all have the identical configurations, unless otherwise noted, a description may be made as the RRH 200.

Figure 3:
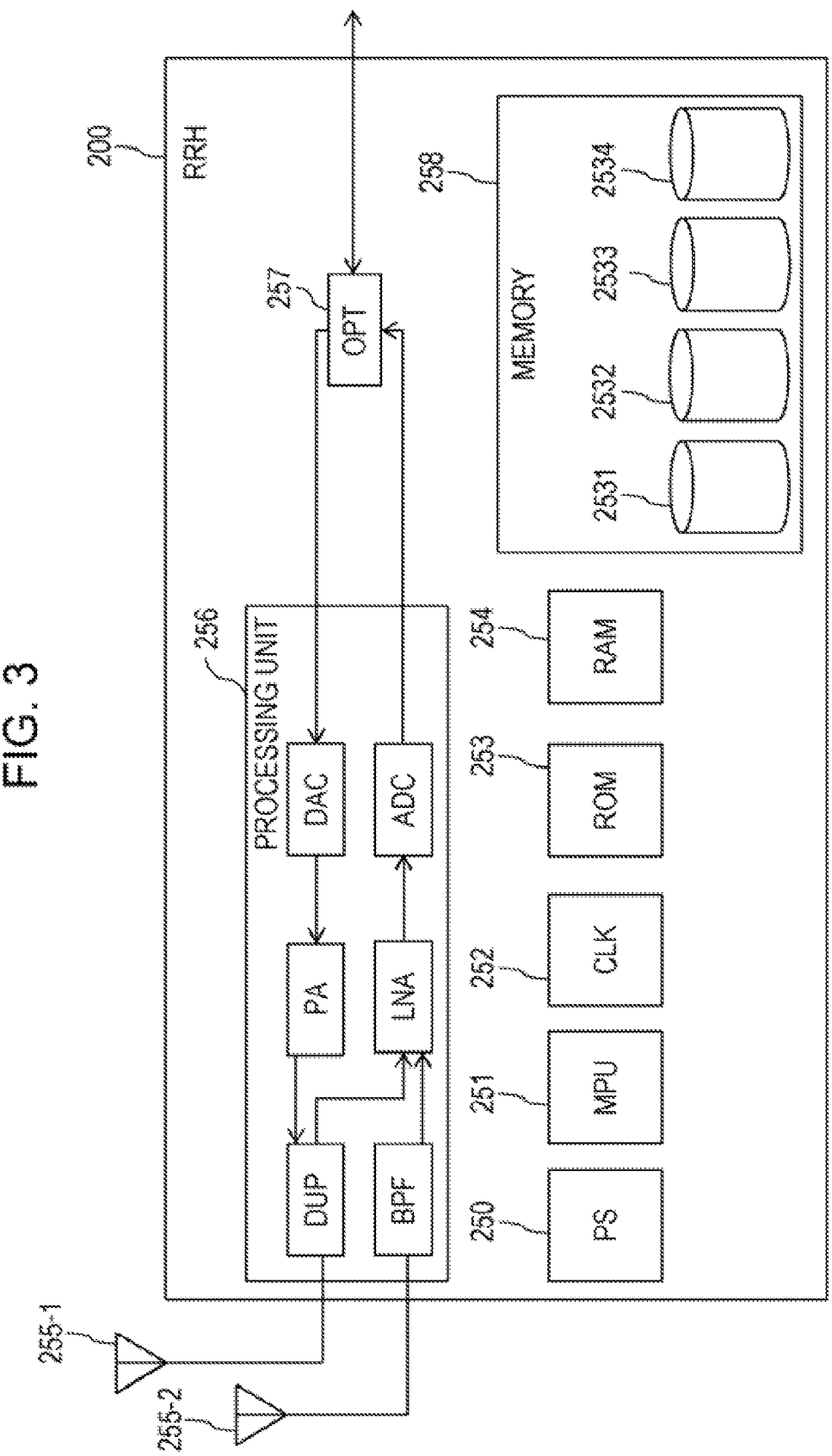
FIG. 3 is a diagram illustrating a hardware configuration example of a RRH.

FIG. 3 illustrates a hardware configuration example of the RRH 200. The RRH 200 includes a power supply (PS) 250, a microprocessor unit (MPU) 251, a dock (CLK) 252, a read only memory (ROM) 253, a random access memory (RAM) 254, and a memory 258. Further, the RRH 200 includes antennas 255-1 and 255-2, a processing unit 256, and an optical module (OPT) 257.

The PS 250 supplies power to the RRH 200. The PS 250 receives power from, for example, a cable connected to the BBU 100.

The MPU 251 reads out a program from, for example, the ROM 253 and loads the program to the RAM 254, and Implements a specific function of the base station device 50 by executing the loaded program. For example, the MPU 251 detects failure or malfunction occurred in each hardware 250, and so on. In addition, for example, failure is a status in which it is not implement a function that a device, hardware, or the like originally have, and malfunction is a problem in hardware or software, which is a cause that makes failure. In the following, failure and malfunction are used without being distinguished, and malfunction may also be referred to as failure.

In the second embodiment, if failure is detected, the MPU 251 calculates a failure impact degree, and autonomously performs various handling procedures on the RRH 200, based on the calculated failure impact degree. The details of the failure impact degree and the handling procedure will be described later.

The CLK 252 transmits pluses, for example, at each certain time interval. The CLK 252 outputs the generated pulses to, for example, the MPU 251 so as to be able to synchronize and operate the processing unit 256 an the like in the RRH 200.

The ROM 253 stores the program executed by, for example, the MPU 251.

The RAM 254 functions as a work area, when for example, the MPU 251 executes the program.

The memory 258 stores, for example, information such as an event DB 2532, an operation DB 2531, a determination log 2533, and an operation log 2534. The details about the event DB 2532 and the like will be described later.

The antenna 255-1 receives a wireless signal from the processing unit 256, and transmits the received wireless signal to the MS 300. Further, the antennas 255-1 and 255-2 receive a wireless signal transmitted from the MS 300, and output the received wireless signal to the processing unit 256.

The processing unit 256 performs, for example, the following process. In other words, the wireless signal received by the antenna 255-1 is output to a duplexer (DUP), and the wireless signal is output to a low noise amplifier (LNA) after the frequency bandwidth of the wireless signal is limited by the DUP. The bandwidth of the wireless signal received by the antenna 255-2 is limited by a band pass filter (BPF), and the wireless signal is output to the LNA. The wireless signal is amplified in the LNA, and is converted from an analog signal into a digital signal by an analog digital converter (ADC). An IQ signal is output to the OPT 257 from the ADC. Further, the digital analog converter (DAC) converts the IQ signal received from the OPT 257 into an analog signal, and the analog signal is amplified by the power amplifier (PA), and wireless signal is output to the antenna 255-1 after the frequency bandwidth is converted into a radio band by the DUP.

The OPT 257 converts, for example, the data, the control signal, and the like that are output from the processing unit 256 into a signal of a predetermined format that can be transmitted to the BBU 100 (for example, a CPRI format) and outputs the converted signal. Further, the OPT 257 extracts the data, the control signal, and the like from the signal of the predetermined format received from, for example, the BBU 100, and outputs the extracted data and signal to the processing unit 256.

Figure 4:
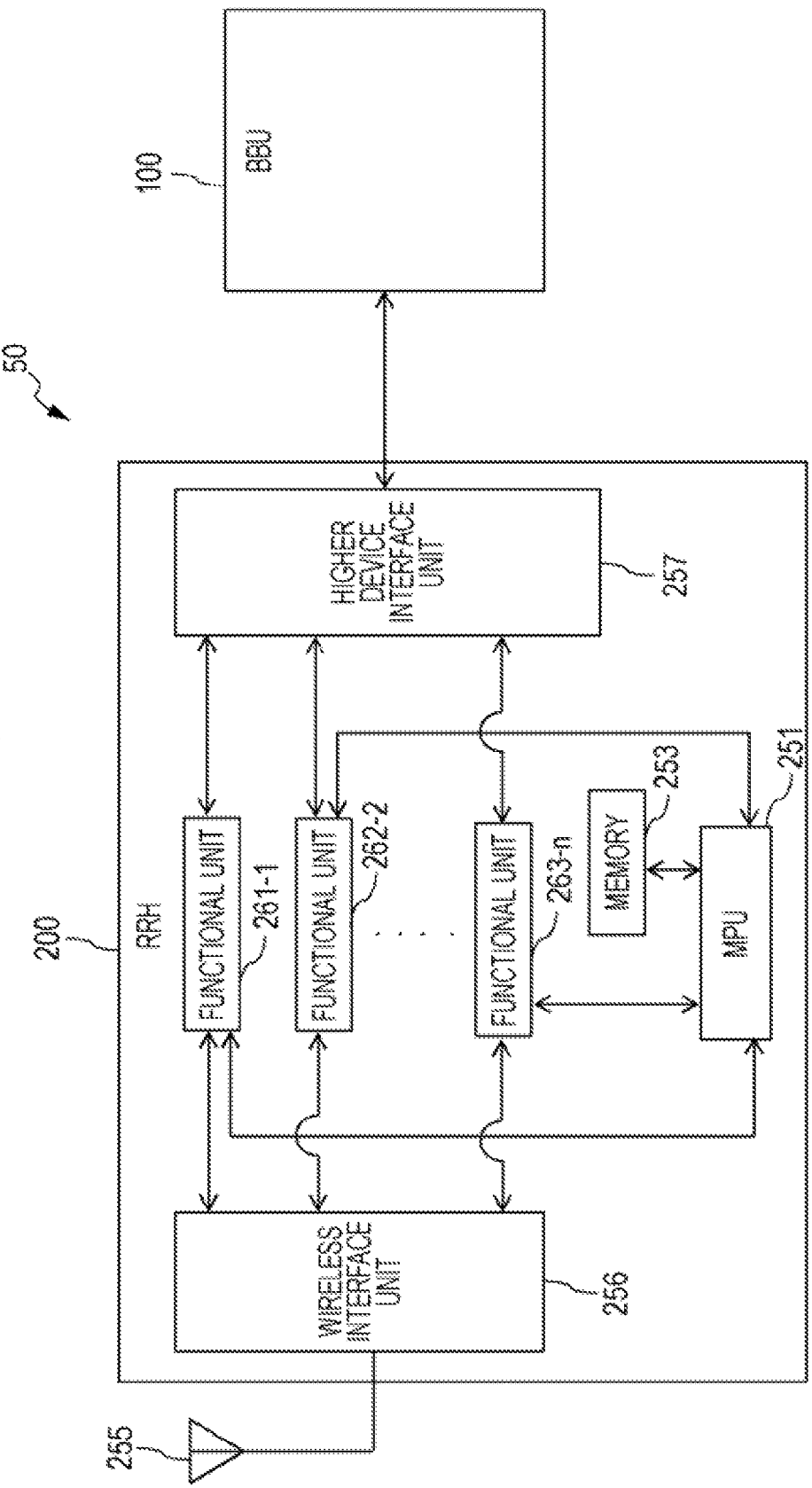
FIG. 4 is a diagram illustrating a configuration example of a functional block diagram of a base station device.

Next, an example from the occurrence of failure to the restoration of the failure in the RRH 200 will be described. FIG. 4 is a diagram for illustrating such an example, and illustrates the configuration example of the base station device 50 including the RRH 200.

In FIG. 4, the RRH 200 includes a plurality of functional units 261-1 to 261-*n*. Each functional unit 261-1 to 261-*n* is, for example, a functional block for monitoring each hardware (for example, the PS 250, the CLK 252, and the like) in the RRH 200. For example, the functional unit 261-1 is a functional block for monitoring the PS 250, and the functional unit 261-2 is a functional block for monitoring the CLK 252.

For example, the functional unit 261-1 monitors the supply power, and if the supply power is a threshold or less, the functional unit 261-1 determines the occurrence of failure in which an appropriate voltage is not supplied from the PS 250, and outputs failure information to the MPU 251.

The MPU 251 calculates the failure impact degree of the failure information received from the functional unit 261-1, and outputs a handling procedure that corresponds to the calculated failure impact degree to the functional unit 261-1. The functional unit 261-1 executes the handling procedure by the MPU 251.

In this way, the respective functional units 261-1 to 261-*n* individually monitor the hardware in the RRH 200 in such a manner that the functional unit 261-1 monitors the PS 250, the functional unit 261-2 monitors the CLK 252. Each functional unit 261-1 to 261-*n* outputs the monitoring result of hardware to the MPU 251, and receives a handling procedure from the MPU 251. Therefore, each functional unit 261-1 to 261-*n* can perform a handling procedure for individual hardware in the RRH 200. Accordingly, even when failure occurs in hardware in the RRH 200, other hardware can continue to operate, and the reduction in the function of the RRH 200 can be limited.

Operation Example

Next, the operation example of the base station device 50 including the calculation of the failure impact degree will be described. When failure occurs in the base station device 50, the RRH 200 autonomously performs a restoration process. The restoration process is an example of the handling procedure at the time of failure occurrence, and, for example, is a process of restating or initializing the hardware in which failure occurs in the RRH 200.

The RRH 200 in the second embodiment performs such a restoration process in a newly defined restoration state. An example of state transition of the RRH 200 including the restoration state will be described later.

State Transition of RRH 200

FIG. 5 illustrates an example of state transition of the RRH 200.

The initial state of the RRH 200 is a stop state (S0). If the RRH 200 is powered ON (E1) and activated (E2) in the stop state (S0), the RRH 200 transitions to an operation state (S1). When failure does not occur, the RRH 200 operates in the operation state (S1). The RRH 200 regularly stores an operating state in the memory 258 in the operation state (S1) (M1). If the RRH 200 is powered OFF (E3) in the operation state (S1), the RRH 200 transitions to the stop state (S0).

If failure occurs (E4) in the operation state (S1), the RRH 200 transitions to a restoration state (S2). In the restoration state (S2), for example, the RRH 200 calculates the failure impact degree of the failure that has occurred, and determines whether or not to autonomously perform a restoration process. The RRH 200 stores information on the failure that has occurred in the memory 258 (M2). The RRH 200 calculates the failure impact degree by referring to the event DB 2532, the operation DB 2531, and the like in restoration state (S2). The failure impact degree calculation method will be described later. Data used for calculating the failure impact degree is stored in the operation DB 2531, and is appropriately updated (M3). The RRH 200 that has transitioned to the restoration state performs a process according to the calculated failure impact degree. For example, if it is determined to autonomously restore failure based on the failure impact degree, the RRH 200 performs an autonomous restoration process, and if the RRH 200 is activated (F1, and E2), the RRH 200 transitions to the operation state (S1). Further, if it is determined not to autonomously restore failure based on the failure impact degree, the RRH 200 does not perform the autonomous restoration process, notifies the BBU 100 of failure information (F2), and performs transition to the stop state (S0) (F3).

Operation Example of RRH 200

Figure 10:
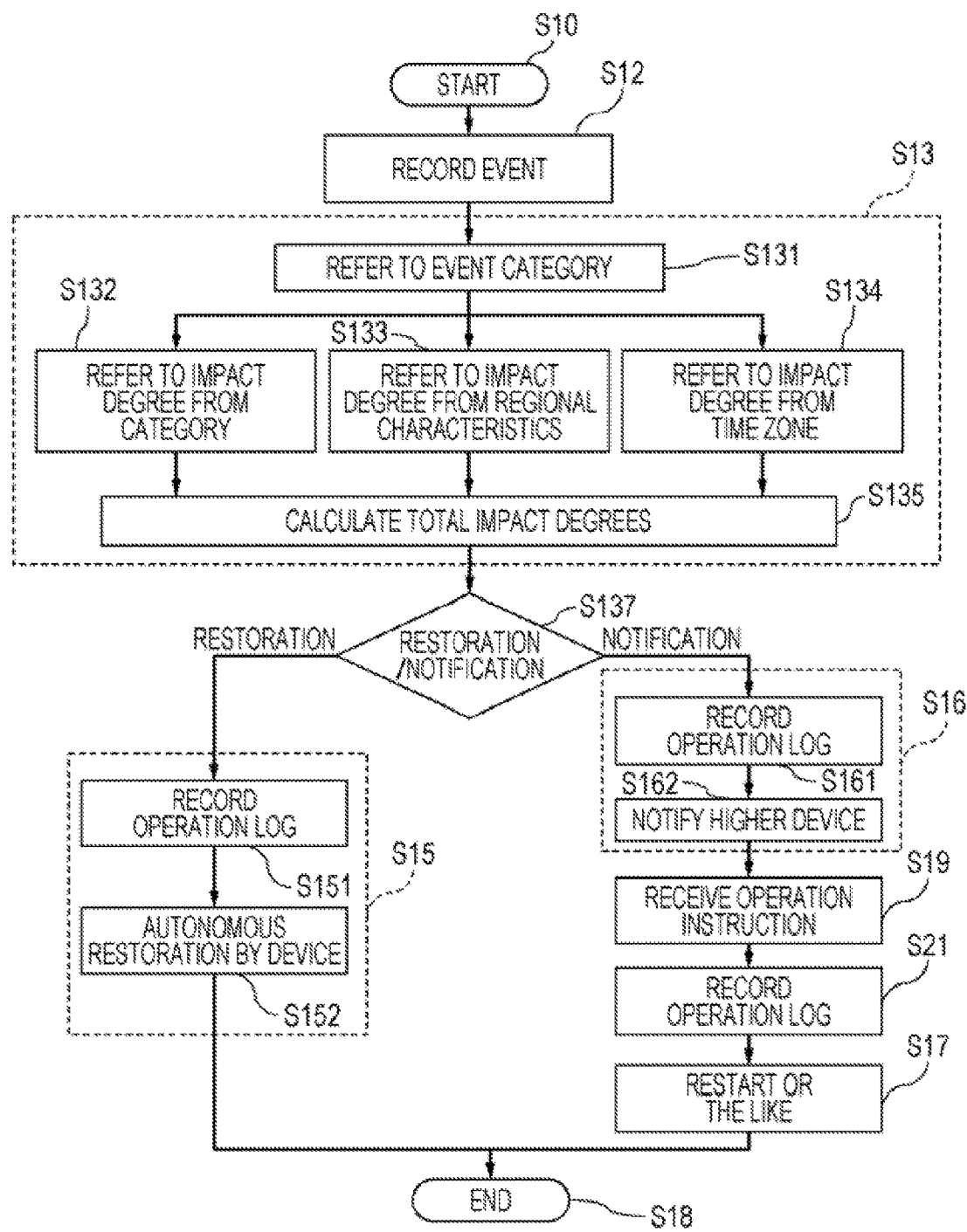
FIG. 10 is a diagram illustrating a detailed process flow example of the RRH.

Next, the operation example performed in the RRH 200 that has transitioned to the restoration state will be described. FIG. 6 and FIG. 10 illustrate an example of a process flow of the RRH 200. FIG. 10 illustrates a detailed process flow of an event determination process (S13), an autonomous restoration process (S15), and a result notification process (S16) of FIG. 6.

If an event such as failure occurs in the operation state (S10) (S11), the RRH 200 stores the occurred event in the event DB 2532 (S12), and performs the event determination process (S13). The specific contents of the event DB 2532 will be described later. Further, if failure occurs (S11), the RRH 200 transitions to the restoration state.

The RRH 200 calculates the failure impact degree in an event determination process (S13). The details of the failure impact degree calculation method will be described later.

Next, when failure is restored in the RRH 200, based on the calculated failure impact degree ("Restoration" In S137), the RRH 200 performs the autonomous restoration process (S15). For example, the RRH 200 compares the calculated failure impact degree with the threshold, if the failure impact degree is the threshold or less, the failure is determined as a minor failure, and the RRH 200 performs the autonomous restoration process. As a result of the autonomous restoration process (S15), if the RRH 200 is activated (S17), the RRH 200 transitions to the operation state and stops the process (S18).

Meanwhile, when the restoration process is not autonomously performed in the RRH 200 based on the calculated failure impact degree ("notification" in S137), the RRH 200 performs a result notification process (S16). For example, the RRH 200 compares the calculated failure impact degree with the threshold, and if the failure impact degree is greater than the threshold, the RRH 200 determines the failure as a major failure. The RRH 200 that determines the failure as the major failure does not the autonomous restoration process, notifies the higher device of failure information and waits for an instruction from a higher device. If a restart instruction (S19) is received from the higher device in the stop state, and if the RRH 200 is activated (S17), the RRH 200 transitions to the operation state and ends the process (S18).

Further, in the restoration process (S15) and the result notification process (S16), the processed contents that is executed, the contents notified to the higher device, and the like are stored in the operation log 2534 as a record of the operating state (S20).

In this manner, when the failure impact degree is calculated and it is determined that the failure can be autonomously restored in the wireless device 200, the RRH 200 performs the autonomous restoration process. The RRH 200 is able to restore the minor failure and provide the continuity of the communication service, by performing the autonomous restoration process, without waiting for the determination of the handling procedure by the system operator. Further, the number of failure information pieces notified to the system operator decreases, and it is possible to reduce the work load of the system operator, by the RRH performing the autonomous restoration process.

Failure Impact Degree Calculation Method

Hereinafter, a failure impact degree calculation method will be described. The failure impact degree is a value indicating the magnitude of the impact on the communication service, due to the occurrence of the failure. For example, the failure having a high failure impact degree indicates a major failure having a large impact on the communication service. Further, for example, the failure having a low failure impact degree indicates a minor failure having a small impact on the communication service.

There are two failure impact degree calculation methods: a first method using a plurality of characteristics and a matrix table (hereinafter, referred to as a matrix), and a second method using a failure level and a failure occurrence probability. Hereinafter, the first method will be described using FIGS. 7 and 8, and the second method will be described using FIG. 9.

1. First Method

First, the first method will be described.

The first method of calculating the failure impact degree is a method of calculating the failure impact degree of the occurred failure, using the plurality of characteristics and the matrix table. Here, the characteristics are factors for determining the failure impact degree, and examples include region characteristics such as the installation location of the RRH 200, time characteristics such as a time zone when the failure occurs, and failure levels.

FIG. 7 is a diagram for explaining a failure impact degree calculation method, and represents a three-dimensional matrix based on three characteristics. For example, region characteristics, time characteristics, and a failure level are used as the three characteristics. In FIG. 7, the three characteristics are used as respective axes of the three-dimensional matrix.

The region characteristics represent, for example, characteristics about the installation location of the RRH 200. The region characteristics represent, for example, whether the region is a country or a city. If the region characteristics are closer to a city, population is increased and the number of the users of the communication system 10 is increased, such that the failure impact degree is increased.

The time characteristics represent, for example, characteristics related to a time (or a timing) when failure occurs. The time characteristics represent, for example, whether the time is night time or day time. With respect to the time characteristics, a larger number of people are working in the daytime, as compared to the night, and the number of the users of the communication system 10 is increased, such that the failure impact degree is increased.

The failure level is, for example, an index indicating the importance or the urgency of the failure. For example, since failure of "The transmission and reception of radio waves are not possible due to failure of an antenna" is a major and urgent failure, the failure level is high. Further, since failure of, for example, "Error occurs in a part of a memory" is a minor failure, the failure level is low.

If failure is detected, the RRH 200 plots three characteristics in a three-dimensional matrix, based on the event DB 2532 and the operation DB 2531, and calculates the failure impact degree. The details will be described later.

A description will be made regarding a case where the plot position is within a range of a square of a thick line indicated by T1. The range indicated by T1 indicates that the failure level is the highest, the time characteristics is night time, and the region characteristics are country side. Thus, for example, although the failure that is occurring at present has a high failure level, since the installation place of the RRH 200 is the country side and the time zone is the night time, the number of users is small, and thus the failure impact degree is calculated as low.

A description will be made regarding a case where the plot position is within a range of a thick line indicated by T2. The range indicated by T2 indicates that the failure level is low, the time characteristics are day time, and the region characteristics are a city. Thus, for example, although the failure that is occurring at present has a low failure level, since the installation place of the RRH 200 is a city and the time zone is the day time, the number of users is large, and thus the failure impact degree is calculated as high.

In this manner, the RRH 200 plots three characteristics in a three-dimensional matrix, and reads out the failure impact degree corresponding to the plotted position so as to calculate the failure impact degree.

Although FIG. 7 illustrates an example of calculating a failure impact degree from three characteristics, but the failure impact degree may be calculated by using four or more characteristics or two characteristics. Hereinafter, an example of using two characteristics will be described using FIG. 8. FIG. 8 is a diagram illustrating an example of a failure impact degree calculation method in a two-dimensional matrix. However, FIG. 8 illustrates a handling procedure corresponding to (or associating with) the failure impact degree. The RRH 200 performs the handling procedure that is read out from the two-dimensional matrix of FIG. 8. In addition, FIG. 8 illustrates the handling procedure, but for example, the value of the failure impact degree may be represented.

In FIG. 8, two characteristics of the characteristic index and the failure level are used. The characteristic index may be a result from determination by combining a plurality of characteristics, in the case of using a single certain characteristic. For example, when the characteristic index is a combination of a plurality of characteristics, the average value obtained by digitizing the urban level of a region and the time zone may be the value of the characteristic index.

The RRH 200 plots the failure that is occurring at present in a two-dimensional matrix. For example, the characteristic index of the failure that is occurring at present is assumed as "Characteristic index #1", and the failure level is assumed as "failure level #1". In this case, the RRH 200 obtains the handling procedure according to the failure impact degree of "notification to higher device" from the two-dimensional matrix. From the result, the RRH 200 performs a process of notifying a higher device of failure information.

1.1 Operation Example in Case of Using First Method

Next, the details of the operation example using the first method will be described. FIG. 10 illustrates an example of a process flow in the case of using the first method as a failure impact degree calculation method. First, a description will be made regarding DBs and logs used when the RRH 200 mainly performs the first method, and next, a specific example will be made using the process flow of FIG. 10.

1.1.1 Description about Each DB and Each Log

The RRH 200 calculates a failure impact degree by using, for example, information stored in the operation DB 2531 and the event DB 2532, and records the result and the like in the determination log 2533 and the operation log 2534. Hereinafter, the operation DB 2531, the event DB 2532, the determination log 2533, and the operation log 2534 will be described.

Figure 11:
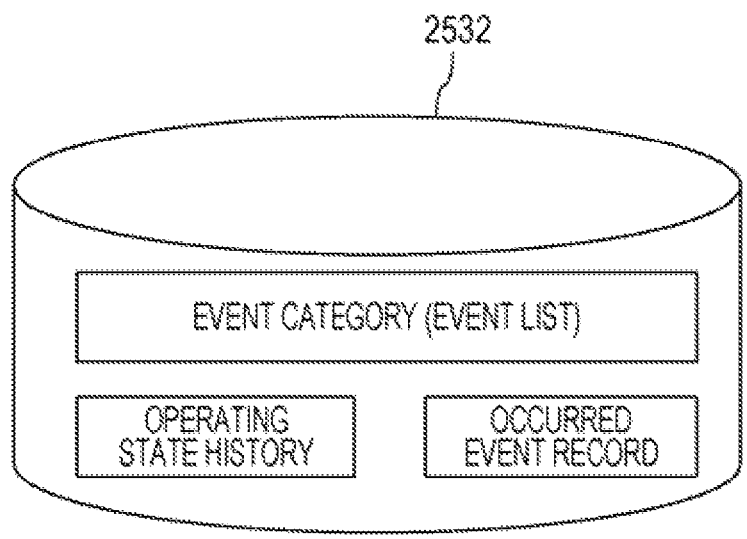
FIG. 11 is a diagram illustrating an example of stored contents of an event DB.

An example of Information stored in the event DB 2532 is illustrated in FIG. 11. The event DB 2532 has items called, for example, "Event category (event list)" (hereinafter, there is a case called "Event category"), "Operating state history", and "Occurred event record", and stores information corresponding to each item.

FIG. 12 illustrates an example of information stored in "Event category". "Event category" is, for example, a list representing a correspondence between an occurred failure and the category of the failure. As information about "Event category", there are "Event", and "Category". "Event" is, for example, an event occurring in the RRH 200, and is the contents of the failure that has occurred. "Category" represents, for example, a category of failure corresponding to "Event", and Is classified according to the importance degree of failure. The information stored in "Event category" is registered in advance when Installing, for example, the RRH 200. Further, the information stored in "Event category" may be updated as appropriate.

Figure 21:
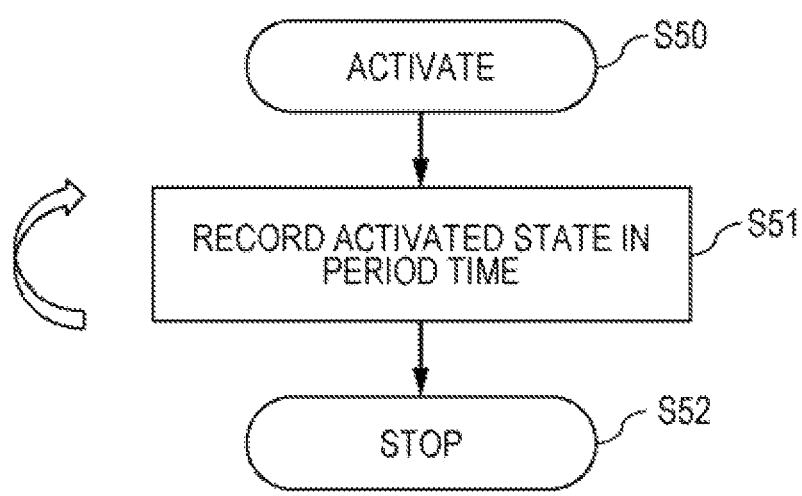
FIG. 21 is a diagram illustrating an example of a flow of an operating state storage process.

FIG. 13 illustrates an example of information stored in "Operating state history". "Operating state history" records, for example, the operating state of the RRH 200. As the Information about "Operating state history", there are "Date and time" and "Operation transition". "Date and time" is, for example, a data and a time when the operating state is recorded, and is a time acquired from an internal clock of the RRH 200. "Operation transition" is, for example, the state of the RRH 200, and each state illustrated in FIG. 5. Information stored in "Operating state history" is stored according to a period of time, from a time when the RRH 200 is activated (S50) to a time when the RRH 200 is stopped (S52), as illustrated in FIG. 21 (S51).

FIG. 14 illustrates an example of information stored in "Occurred event record". "Occurred event record" records, for example, an event occurred in the RRH 200. As information of "Occurred event record", there are "Date and time" and "Event". "Date and time" is, for example, a data and a time when an event occurs, and is a time acquired from an Internal dock of the RRH 200. "Event" is, for example, an event that occurs or is restored in the RRH 200, and is recorded as "No. 4 occurrence". "No. 4" in "No. 4 occurrence" Indicates, for example, the number corresponding to "No." (FIG. 12) described in "Event category". Information stored in "Occurred event record" is recorded when an event occurs or restored in the RRH 200.

Figures 15, 16:
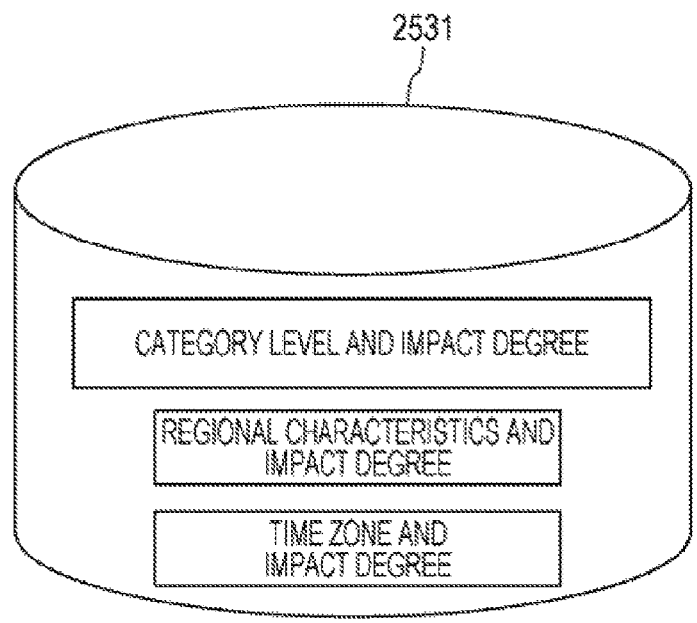
FIG. 15 is a diagram illustrating an example of stored contents of an operation DB.
FIG. 16 is a diagram illustrating an example of a list of a category level and an impact degree.

An example of information stored in the operation DB 2531 is illustrated in FIG. 15. The operation DB 2531 has, for example, items called "Category level and impact degree", "Regional characteristics and impact degree", and "Time zone and impact degree", and stores information corresponding to each item.

FIG. 16 illustrates an example of Information stored in "Category level and impact degree". "Category level and impact degree" is, for example, a list representing a correspondence between the category of an occurred failure and the impact degree of the failure. As information about "Category level and impact degree", there are "Category", "Operation", and "Impact degree". "Category" represents, for example, a category of failure corresponding to "Event", and is classified according to the importance degree of failure. "Operation" represents, for example, a handling procedure when failure corresponding to each "Category" occurs. "Impact degree" is, for example, a failure impact degree corresponding to "Category", and is represented by a numeral value, in which as the numeral value is smaller, it represents that failure is minor. In addition, in the second embodiment, an failure impact degree is calculated, a handling procedure according to the calculated failure impact degree is performed, and a handling method as well as an index other than "Category" are determined. Meanwhile, the processing contents described in "Operation" describes the processing contents in the case of determining the handling procedure, with only "Category" as an index, and in the second embodiment, the contents described in "Operation" is not used.

FIG. 17 illustrates an example of information stored in "Regional characteristics and impact degree". "Regional characteristics and impact degree" is, for example, a list representing a correspondence between the installation place of the RRH 200 and the impact degree of the occurred failure. As information about "Regional characteristics and impact degree", there are "Regional characteristics", "Operation", and "Impact degree". "Regional characteristics" represents, for example, the characteristics of the place where the RRH 200 is installed, and is classified according to the density of the population such as "urban type". "Operation" represents, for example, a handling procedure when failure corresponding to each "Regional characteristics" occurs. "Impact degree" is, for example, a failure impact degree corresponding to "Regional characteristics", and is represented by a numeral value, in which as the numeral value is smaller, it represents that failure is minor. Further, similar to "Operation" (FIG. 16) of "Category level and impact degree", for example, in the case of determining the handling method, with only "Regional characteristics" as an Index, without calculating the failure impact degree, the RRH 200 performs the processing contents described in "Operation".

FIG. 18 illustrates an example of information stored in "Time zone and impact degree". "Time zone and impact degree" is, for example, a list representing a correspondence between the time zone when the failure occurs in the RRH 200 and the impact degree of the failure. As information about "Time zone and impact degree", there are "Time zone", "Operation", and "Impact degree". "Time zone" represents, for example, characteristics about a time when failure occurs, and a single day is classified into "Midnight to morning" or the like depending on the number of active people. "Operation" represents, for example, a handling procedure when failure corresponding to each "Time zone" occurs. "Impact degree" is, for example, a failure impact degree corresponding to "Time zone", and is represented by, for example, a numeral value, in which as the numeral value is smaller, it represents that failure is minor. Further, similar to "Operation" (FIG. 16) of "Category level and impact degree", for example, in the case of determining the handling method, with only "Time zone" as an index, without calculating the failure impact degree, the RRH 200 performs the processing contents described in "Operation".

The information stored in the operation DB 2531 is registered in advance when installing, for example, the RRH 200. Further, the information stored in the operation DB 2531 may be updated as appropriate.

An example of information stored in the determination log 2533 is illustrated in FIG. 19. The information stored in the determination log 2533 is a log that records the calculation result of the failure impact degree. As information stored in the determination log 2533, there are "Event No.", "Occurrence time", "Category level", "Regional characteristics", "Time zone", "Total impact degree", and "Determination". "Event No." is, for example, the failure number for which the failure impact degree is calculated. "Event No." is, for example, a numeral value corresponding to "No." (FIG. 12) of "Event category" of the event DB 2532. "Occurrence time" is, for example, a time of the occurrence of the failure for which the failure impact degree is calculated, and is acquired from "Date and time" (FIG. 14) of "Occurred event record" of the event DB 2532. "Category level", "Regional characteristics", and "Time zone" respectively represent "Impact degree" which are calculated from "Category level and impact degree" (FIG. 16), "Regional characteristics and impact degree" (FIG. 17), and "Time zone and impact degree" (FIG. 18) of the operation DB 2531. "Total impact degree" is, for example, a failure impact degree, and represents a failure impact degree that is determined from the Impact degree of "Category level", "Regional characteristics", and "Time zone". "Determination" represents, for example, a handling procedure according to "Total impact degree", and represents whether to perform autonomously a restoration treatment, such as "autonomous restart". Information stored in the determination log 2533 is stored, when the RRH 200 calculates the failure impact degree, and determines the handling procedure for the failure.

An example of information stored in the operation log 2534 is illustrated in FIG. 20. The information stored in the operation log 2534 is a log that records the restoration treatment performed in the RRH 200, and the notified contents to the higher device. As information of the operation log 2534, there are "Date and time", "Event", "Operation record", and "Result". "Date and time" is, for example, a date and time when the RRH 200 performs the restoration process, and a date and time when the higher device is notified of failure information, and is a time acquired from an internal clock of the RRH 200. "Event" is, for example, the contents of the failure that has occurred in the RRH, and the number corresponding to "NO." (FIG. 16) of "Event category" of the event DB 2532. "Operation record" records which kind of process has been performed, for example, as a result of the determination of the failure impact degree, and records specific processing contents such as only reception unit restart process". "Result" records the result of performing the treatment recorded in "Operation record", and when the failure of the RRH 200 is removed from the result of the restoration process, "good" is recorded. The information stored in the operation log 2534 is recorded, when the RRH 200 performs the restoration process, and notifies the higher device of failure information.

1.1.2 Operation Example

Hereinafter, the process flow of FIG. 10 will be described.

The RRH 200 starts a process associated with the failure occurrence (S10), and stores the contents of the failure that has occurred in the event DB 2532 as "Occurred event record" (FIG. 14) (S12).

Next, the RRH 200 performs an event determination process (S13). The contents of the event determination process (S13) will be described.

In the event determination process (S13), the RRH 200 reads out the contents of the failure that is occurring, from "Occurred event record" (FIG. 14) stored in the event DB 2532. The RRH 200 extracts a category of the failure that is occurring, from "Event category" (FIG. 12) stored in the event DB 2532 and the contents of the failure that is occurring (S131). For example, if the failure that is occurring is "Transmission path output error", the RRH 200 extracts the corresponding "Major" as the category of failure.

Subsequently, the RRH 200 extracts the impact degree of the category corresponding to the failure that is occurring, from the list of "Category level and impact degree" (FIG. 16) stored in the operation DB 2531 (S132). For example, if the category of the failure that is occurring is "Major", the RRH 200 extracts corresponding "6" as the impact degree of the failure category. The impact degree of the failure category corresponds to, for example, "failure level" in the first method described above.

Further, the RRH 200 extracts the impact degree for the situation in which the RRH 200 is installed, from the list of "Regional characteristics and impact degree" (FIG. 17) stored in the operation DB 2531 (S133). For example, when the region where the RRH 200 is installed is urban, the regional characteristics is "urban", and the RRH 200 extracts the corresponding "7" as the impact degree of the regional characteristics. The impact degree of the regional characteristics corresponds to, for example, "Region characteristics" in the aforementioned first method. Information on the installation location of the RRH 200 may be stored in advance in the memory 258 by the system operator. Further, information on the installation location of the RRH 200 may be changed. In a case where the status of the vicinity of the place in which the RRH 200 is installed varies, such as a case where the population around the Installation place of the RRH is increased rapidly.

Further, the RRH 200 extracts the impact degree for the time zone when the failure has occurred, from the list of "Time zone and impact degree" (FIG. 18) stored in the operation DB 2531 (S134). Information about the time zone of the failure occurrence is acquired from, for example, a clock inside the RRH 200. When the time when the failure has occurred is around 5:00 in the morning, the RRH 200 determines the time zone as "Early morning" and the corresponding "2" as impact degree of the time zone. The impact degree of the time zone corresponds to, for example, "Time characteristics" in the first method described above.

After calculating the impact degree corresponding to the characteristics such as the failure category, the regional characteristics, and the time zone, the RRH 200 calculates a total impact degree (S135). For example, the RRH 200 prepares a three-dimensional matrix indicated in the first failure impact degree calculation method, and calculates the failure impact degree by reading out the failure impact degree corresponding to each impact degree, from the matrix. For example, when the impact degree of the category level is "6", the impact degree of the regional characteristics is "7", and the impact degree of the time zone is "7", the failure impact degree "7" corresponding to each impact degree is read out from the matrix, and is regarded as the failure impact degree. Further, the RRH 200 may regard, for example, the average value of three impact degrees as the failure impact degree. For example, when the impact degree of the category level is "6", the impact degree of the regional characteristics is "7", and the impact degree of the time zone is "7", the average value is "6.66 . . . ", and the failure impact degree is "7 (when rounded in the first decimal place)". Further, for example, the maximum value or the minimum value of three impact degrees may be regarded as the failure impact degree. For example, when the impact degree of the category level is "6", the impact degree of the regional characteristics is "7", and the impact degree of the time zone is "7", if the maximum value is regarded as the failure impact degree, the failure impact degree is "7"; if the minimum value is regarded as the failure impact degree, the failure impact degree is "6".

The RRH 200 makes a determination as to whether the failure is autonomously restored from the calculated failure impact degree. The RRH 200 compares, for example, the failure impact degree with a threshold value, and determines the failure as autonomously restorable failure, if the failure impact degree is the threshold value or less.

If the failure impact degree is calculated and a determination as to whether or not to autonomously restore failure is performed, the RRH 200 records logs in the determination log 2533. The RRH 200 stores information on the failure number in "Event No." of the determination log 2533, and records the time when failure has occurred, in "Occurrence time". Further, the RRH 200 records the impact degree of the category level, the impact degree of the regional characteristics, the impact degree of the time zone, and the failure impact degree, in "Category level", "Regional characteristics", "Time zone", and "Total impact degree" of the determination log 2533. Further, the RRH 200 records the determination result as to whether or not to autonomously restore failure in "Determination" of the determination log 2533. For example, when it is determined to autonomously restore failure, the RRH 200 records "autonomous restart", in "Determination" of the determination log 2533.

Next, when it is determined that the failure is failure that can be autonomously restored in the wireless device 200 ("Restoration" in S137) from the result of event determination process (S13), the RRH 200 performs an autonomous restoration process (S15). In the autonomous restoration process (S15), first, a handling procedure for autonomous restoration is recorded in "Operation record" of the operation log 2534 (S151). For example, when the RRH 200 resets the receiving unit that manages the transmission and reception of the wireless signal of the RRH 200, and do not anything for other functional units as they are, as a handling procedure for the autonomous restoration, the RRH 200 records "Only reception unit restart process" in "Operation record" of the determination log 2533.

After recording information in the operation log 2534, the RRH 200 performs the handling procedure for autonomous restoration (S152). The RRH 200 may record the result of performing the handling procedure for restoration in "Result" of the operation log 2534. For example, if the failure is removed from the result of performing the handling procedure for restoration, the RRH 200 records "good". After performing the handling procedure for autonomous restoration, the RRH 200 ends the process associated with the failure occurrence (S18).

Further, when it is determined not to restore failure in the autonomous process in the RRH 200, from the result of the event determination process (S13) ("notification" in S137), the RRH 200 performs the result notification process (S16). In the result notification process (S16), notifying the BBU 100 of failure information is recorded in "Operation record" of the operation log 2534 (S161). After recording the information in the operation log 2534, the RRH 200 notifies the BBU 100 of failure information (S162). Thereafter, if receiving an operation instruction from the BBU 100 (S19), the RRH 200 records the contents of the operation instruction in "Operation record" of the operation log 2534 (S21), and performs the procedure that has been instructed by the operation instruction. The RRH 200 may record the result of performing the procedure that has been instructed by the operation instruction in "Result" of the operation log 2534. After performing the instructed procedure, the RRH 200 is restarted (S17), and the RRH 200 ends the process associated with the failure occurrence (S18).

As described above, the RRH 200 in the second embodiment calculates the failure impact degree, from the contents of failure, the installation location of the RRH 200, the failure occurrence time, and the like, and can autonomously perform the restoration process for a minor failure. Since the RRH 200 autonomously performs the restoration process for the minor failure, the RRH 200 can perform restoration process without waiting for the determination by the system operator, and can provide the continuity of communication services. Further, since the RRH 200 autonomously performs the restoration process for the minor failure, the number of pieces of failure information notified to the system operator is reduced, and the work load of the system operator is reduced.

2. Second Method

Hereinafter, a second method will be described.

A second method of calculating a failure impact degree is a method of calculating failure impact degree based on the failure level or the failure occurrence probability of the failure that is occurring.

As the relationship between the failure level and the failure occurrence probability, there is a tendency of "The occurrence probability of serious failure or failure affecting a range of a wide area is low, and the occurrence probability of a mild failure or failure affecting only a local area is high". Here, "serious" and "Mild" represent the height of the failure level, and "affecting a range of a wide area" and "affecting only a local area" represent the height of the failure impact degree. In other words, failure of a high failure level and failure of a high failure impact degree have low occurrence probability, and failure of a low failure level and failure of a low failure impact degree have high occurrence probability.

The failure impact degree is calculated from the failure level and the failure occurrence probability, using the relationship. First, it can be regarded that the relationship between the failure level and the failure occurrence probability corresponds to a power distribution. Further, from the relationship in which "If the failure impact degree is low, the failure occurrence probability is high, and if the failure impact degree is high, the failure occurrence probability is low", it is possible to regard the failure impact degree as the reciprocal of the failure occurrence probability.

In the second method, a power distribution chart of the failure level and the failure occurrence probability is prepared based on the result of measuring the actual failure occurrence probability, and a graph illustrating the relationship between the failure impact degree and the failure level is prepared based on the distribution chart, by regarding the reciprocal of the failure occurrence probability as a failure impact degree.

In this case, a graph illustrating a relationship between the failure impact degree and the failure level varies depending on the actual failure occurrence probability. FIG. 9 illustrates two graphs (K1, K2) illustrating the relationship between the failure impact degree and the failure. Hereinafter, a relationship between a difference between the failure occurrence probabilities and K1, K2 will be described.

For example, a difference between the occurrence probability of failure having a low failure level and the occurrence probability of failure having a high failure level is considered. When the difference of the failure occurrence probabilities is large, the failure level is increased, and the failure impact degree is also significantly increased, such that a graph having a large increase rate of the failure impact degree such as K1 is obtained. Conversely, when the difference of the failure occurrence probabilities is small, even if the failure level is increased, the failure impact degree is not significantly increased, such that a graph having a small increase rate of the failure impact degree such as K2 is obtained. Thus, a graph illustrating a relationship between the failure impact degree and the failure level varies depending on the difference in the occurrence probabilities.

Next, the failure impact degree calculated by the second method will be described. Here, a description will be made regarding the case where the relationship between the failure level and the failure impact degree is a graph indicated by K1.

The failure impact degree corresponding to failure levels Lv1, Lv2, and Lv3 are respectively d11, d12, and d13. When the failure level increases from Lv1 to Lv2, the failure impact degree increases from d11 to d12, and the width indicated by y1 Increases. Further, when the failure level increases from Lv2 to Lv3, the failure impact degree increases from d12 to d13, and the width indicated by y2 increases. If comparing y1 with y2, it can be seen that the width y2 is larger. In other words, even if the increase width of the failure level from Lv1 to Lv2 and the increase width of the failure level from Lv2 to Lv3 are identical, the Increase widths of the failure impact degree are different.

In the second method, a graph illustrating the relationship between the failure impact degree and the failure level is prepared by regarding the relationship between the actual failure occurrence probability and the failure level as power distribution, and by regarding the reciprocal of the failure occurrence probability as a failure impact degree. In a method of calculating the failure impact degree from the graph that is prepared in this way, the failure level has not become the failure impact degree, and it is possible to calculate a more accurate failure impact degree in which the failure occurrence probability is considered.

In the second method, for example, an index of a combination of the failure level and other characteristics may be used in place of the failure level, or an indicator other than the failure level may be used.

The process after calculating the failure impact degree by using the second method is similar to the process in the case of calculating the failure impact degree by using the first method.

Even if the failure impact degree is calculated by using the second method, it is possible to achieve the same effect as in the case of calculating the failure impact degree by using the first method.

Others

In embodiments describe above, the description has simply been made with the wireless communication system as an example. In addition to the wireless communication system, there is a system (or a device) in which a higher sub-system that centrally controls certain functions and performance, and a lower sub-system that operates dependently, based on the instructions from the higher sub-system are hierarchically configured. The above-described embodiments do not deny a general aspect about autonomous maintenance of functions and services in the hierarchically configured system, other than the wireless communication system.

In addition, the region characteristics changes even in the RRH 200 installed in the same location, such as a case where the state of the installation location of the RRH 200 varies, for example, the number of people around the installation location of the RRH 200 is rapidly increased, and the like. The RRH 200 assumes this case, and treats information of each characteristic, or the operation DB as updatable data. In this way, since the data for calculating the failure impact degree is changeable data, the RRH 200 can calculate a more accurate failure impact degree, and can determine a more optimal handling procedure for the continuation of communication services.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless device comprising:
an antenna wirelessly coupled to a terminal;
a network interface coupled to a baseband unit (BBU) that perform baseband processing; and
a processor configured to:
convert a wireless signal received from the terminal into a baseband signal to be transmitted to the BBU,
convert a baseband signal received from the BBU into a wireless signal to be transmitted to the terminal, and
determine, when failure occurs in the wireless device, whether the wireless device takes a measure to restore the failure or not based on a first index indicating a level of the failure and a second index relating to the number of users that are affected by the failure.

2. The wireless device according to claim 1, wherein the second index includes at least one of an index indicating a location of the wireless device, an index indicating a timing in which the failure occurs, and an index indicating a probability with which the failure occurs.

3. The wireless device according to claim 1, further comprising:
a memory configured to store each of associations among each first index, each second index, and each measure to restore the failure, wherein
the processor is configured to determine whether the wireless device takes the measure to restore the failure or not based on the stored associations.

4. The wireless device according to claim 1, wherein the second index includes an index indicating a location of the wireless device, and
the second index is changed when a situation of the location of the wireless device changes.

5. The wireless device according to claim 1, wherein the processor is configured, when determining that the wireless device takes the measure to restore the failure, to autonomously take the measure to restore the failure.

6. The wireless device according to claim 5, further comprising:
a memory, wherein
the processor is configure to record the taken measure to restore the failure to the memory.

7. The wireless device according to claim 1, wherein the processor is configured, when determining that the wireless device takes the measure to restore the failure, to independently take the measure to restore the failure.

8. A wireless base station comprising:
a remote radio head (RRH) wirelessly coupled to a terminal; and
a baseband unit (BBU) that perform baseband processing, wherein
the RRH is configured to:
convert a wireless signal received from the terminal into a baseband signal to be inputted to the BBU,
convert a baseband signal outputted from the BBU into a wireless signal to be transmitted to the terminal, and
determine, when failure occurs in the RRH, whether the RRH takes a measure to restore the failure or not based on a first index indicating a level of the failure and a second index relating to the number of users that are affected by the failure.

9. A control method comprising:
- converting by a remote radio head (RRH), a wireless signal received from a terminal into a baseband signal to be transmitted to a baseband unit (BBU) that perform baseband processing;
- converting by the RRH, a baseband signal received from the BBU into a wireless signal to be transmitted to the terminal; and
- determining by the RRH, when failure occurs in the RRH, whether the RRH takes a measure to restore the failure or not based on a first index indicating a level of the failure and a second index relating to the number of users that are affected by the failure.

* * * * *